Nov. 17, 1953 J. C. SCHELLENG 2,659,813

FREQUENCY MODULATION REPEATER

Filed Feb. 11, 1950 2 Sheets-Sheet 1

INVENTOR
J. C. SCHELLENG
BY H. A. Burgess
ATTORNEY

INVENTOR
J. C. SCHELLENG
BY H. A. Burgess
ATTORNEY

Patented Nov. 17, 1953

2,659,813

UNITED STATES PATENT OFFICE 2,659,813

FREQUENCY MODULATION REPEATER

John C. Schelleng, Interlaken, N. J., assignor to Bell Telephone Laboratories, Incorporated, New York, N. Y., a corporation of New York Application February 11, 1950, Serial No. 143,765

8 Claims. (Cl. 250—15)

This invention relates to frequency control and, more particularly, to frequency control of a frequency-modulated signal which may contain a variable direct-current component.

When the wave form to be transmitted by a frequency-modulation system contains slowly varying or variable direct-current components, the problem of automatic frequency control is not solved by the relatively simple means which may be employed when the signal has no direct-current component, as, for example, in speech. It is important with signals containing direct-current components that the average of the signal taken over any interval, however long, be accurately reproduced at the receiver in order that the intelligence being transmitted may be properly interpreted. With certain important types of signals, it is possible to restore the slowly varying components, assuming them to have been removed at an earlier point, by means now well known in the art. However, in those parts of the system where the direct-current signal is absent, a certain price in amplitude capacity has to be paid and if the amplitude at these points is represented by the instantaneous frequency, the price may be intolerable. In television signals, for example, the instantaneous frequencies required may be nearly doubled as a result of eliminating the direct current. It is, therefore, desirable to transmit and relay such signals without disturbing their direct-current content.

It is an object of the invention to control the frequency of a frequency-modulated signal without disturbing its direct-current content.

It is also an object of the invention to control both the mean frequency and the frequency swing of a frequency-modulated signal.

More specifically, it is an object of the invention to properly locate a relayed frequency-modulated signal in its assigned frequency band and to maintain the frequency swing of the relayed signal the same as that of the received signal.

In accordance with illustrative embodiments of the invention which will be described in detail hereinafter, frequency control of a frequency-modulated signal which may contain a variable direct-current component is effected at a remodulating repeater by controlling both the mean frequency and the frequency swing of the relayed signal. The frequency error of the remodulated signal is obtained by comparing it with the received signal. Two control currents are derived from this frequency error, one which is proportional to the average frequency error and another which is proportional to the frequency error measured at known points in the modulation cycle. One of these currents controls the frequency swing, and the other the mean frequency of the relayed signal so that the transmitted signal is properly located in its assigned frequency band and is reproduced with the same frequency swing as that of the received signal. This dual control is accomplished in accordance with the invention without disturbing the direct-current content, if any, of the signal being transmitted.

These and other objects of the invention will be better understood by a consideration of the following detailed description when taken in accordance with the attached drawings, in which:

Fig. 4 is a block schematic diagram of a repeater similar to the one of Fig. 2 but adapted to relay any frequency-modulated signal having a variable direct-current component; and Fig. 5 shows wave forms illustrative of Fig. 4.

Figure 1:
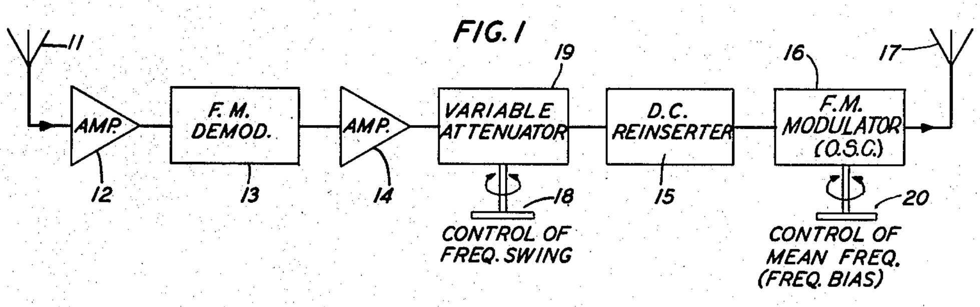
Fig. 1 is a block schematic of a remodulating repeater for relaying frequency-modulated signals, which is illustrative of the general nature of the present invention.

A simplified representation of a frequency-modulated repeater to which it is desired to apply automatic frequency control is shown in Fig. 1. Signal energy is received at the antenna 11 and amplified by the radio frequency amplifier 12. The original signal is recovered by a frequency-modulation demodulator 13, which may be of any well-known type, and is amplified by the amplifier 14. Amplifier 14 may be direct-current coupled so as to pass any slowly varying components of the signal, or it may be of the more conventional type, as indicated in the figure, which excludes very low frequencies but which includes a direct-current reinserter 15 at a subsequent point. The requirements of direct-current reinsertion depend on the characteristics of the particular type of wave form being transmitted and may be effected by any of the means well known in the art. The recovered signal, after amplification, is remodulated by the frequency modulation oscillator 16 and then transmitted by the antenna 17.

Two controls are indicated in the circuit of Fig. 1, and, for the moment, will be considered as hand operated. Control 18 is indicated as a control of frequency swing and may, for example, control a variable attenuator 19 in the signal frequency stage of the repeater or may vary the grid bias of a variable-mu tube in the same stage, in a manner well known in the art. Control 20 controls the mean frequency of the wave to be transmitted. In radio repeaters, it is customary to relay signals with a frequency different from that of the received signals so that the output frequency of the oscillator 16 will usually be different by a predetermined amount from the mean frequency of the incoming waves. This difference may be thought of as a frequency bias. Likewise, control 20 may be thought of as a control of the frequency bias.

In the course of time, slow changes may occur in the repeater, some which will affect the frequency bias and others the frequncy swing. If means are available to indicate the effects of these changes, an operator can feed back this information by means of the controls 18 and 19 until the deviations of the frequency swing and of the frequency bias from their correct values are negligible.

Figure 2:
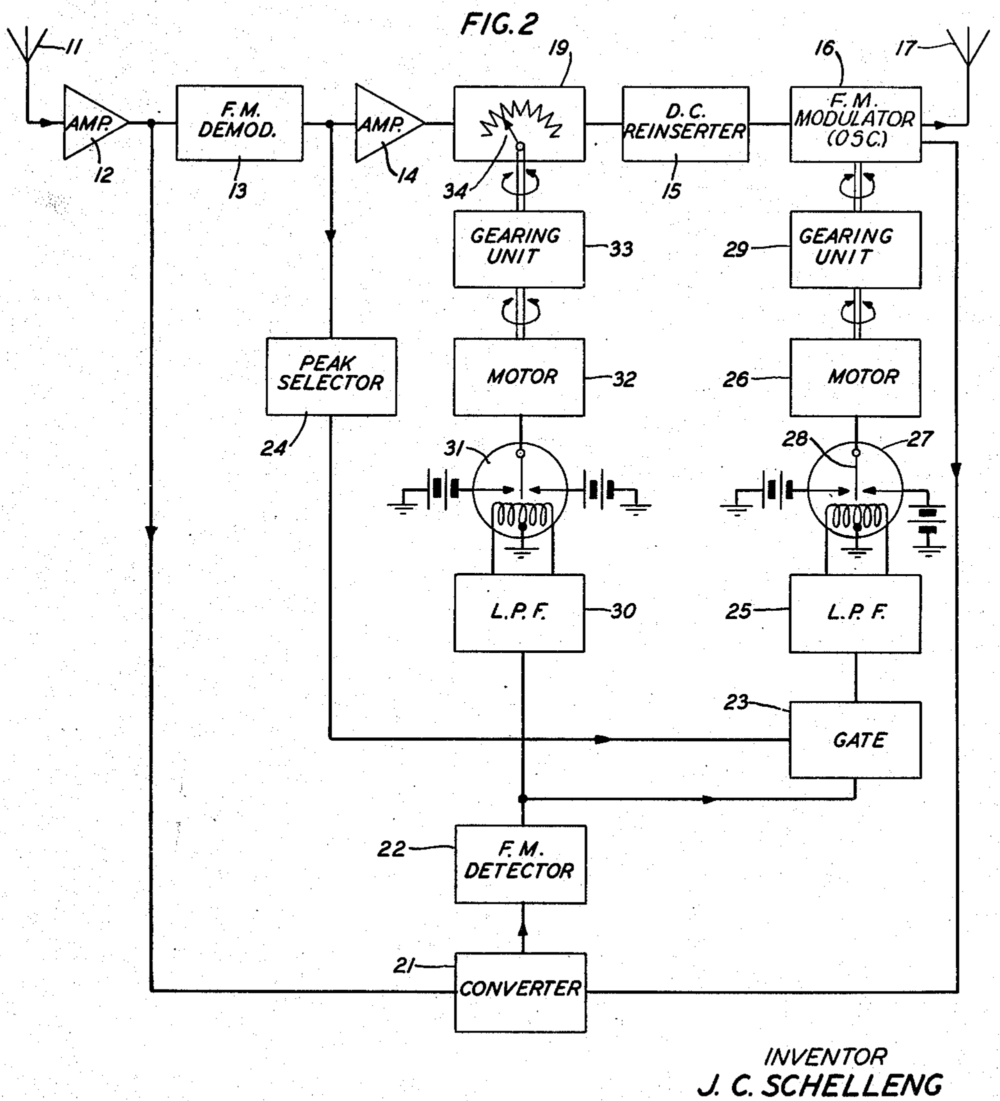
Fig. 2 is a block schematic diagram of a repeater embodying principles of the present invention and adapted for relaying television signals.

Automatic operation may be had in different ways. Referring now to Fig. 2, a remodulating repeater of the type shown in Fig. 1 is adapted for automatic control of the mean frequency and the frequency swing when the signal to be relayed is a standard television signal. A portion of the amplifier incoming signal from the output of the amplifier 12 and a portion of the remodulated signal output of the oscillator 16 are fed to a converter 21 which derives the beat frequency therebetween and delivers it to a frequency-modulation detector 22. The converter 21 may, for example, consist of a silicon crystal device of a type now well known in the art, such as is used in converting incoming microwave frequencies to intermediate frequencies, while the detector 22 may comprise a wide band discriminator and detector of a general type which is also well known. If the output of the converter 21 is the difference frequency of the two signals applied thereto, its output will equal the frequency bias when the remodulated signal is of the proper mean frequency and frequency swing. The detector 22 is assumed to be a balanced device and is adjusted so that its balance frequency is equal to the frequency bias. Its output will therefore be positive or negative, depending on whether its input frequency is above or below the frequency bias and it will have an amplitude proportional to the frequency error.

Two control currents are derived from the output of detector 22, one to control the mean frequency of the remodulated wave and the other the frequency swing. The mean frequency of the remodulating oscillator 16 is controlled by a first control current which varies in accordance with the frequency error of the remodulated signal measured at times when the modulating signal has a known reference value. In a television signal, this reference value may, for example, be the synchronizing pulses which will normally be of constant frequency. To this end, a portion of the output of detector 22 is applied to a gate 23. The normally closed gate 23 is opened by the synchronizing pulses which are separated from the composite signal wave by the peak selector 24 which may, for example, be as shown in Fig. 217B of "Principles of Television Engineering" by Fink, McGraw-Hill, New York, 1940. The gate 23 may, for example, be of the type described by Meacham and Peterson in the Bell System Technical Journal, vol. 27, 1948, on page 27, Fig. 12(b). The output of gate 23 will be a series of positive or negative pulses, depending on whether the output frequency of the remodulating oscillator 16 during the interval of the synchronizing pulses is greater or less than the incoming frequency at the same time plus the frequency bias. Thus, this control current is weighted in favor of the frequency errors occurring in the sense of deviation corresponding to the synchronizing pulses, in fact, the errors occurring at other times are without effect. A low-pass filter 25 derives the direct-current component from this pulse series which serves to control the manner of rotation of a motor 26 by means of a three-position relay 27. If the direct current of the pulse series is less than a threshold value, the deflection of the relay armature 28 is insufficient to cause the relay to close. Currents in excess of this value will cause armature 28 to make one or the other of its two contacts so that either a positive or negative voltage will be applied to the motor 26 and it will rotate in a direction depending on the sense of the frequency error. The armature of motor 26 is mechanically coupled to a frequency controlling element in oscillator 16 by a gearing unit 29 and will adjust the oscillator 16 frequency in such a direction as to correct the deviations which initiated the rotation of motor 26. Rotation of the motor will continue until the error is decreased below the aforementioned threshold value. An example of motor-controlled frequency regulation may be found in J. F. Morrison Patent 2,250,104 dated July 22, 1941. The first control current as just described therefore automatically adjusts the output frequency during synchronizing pulses to differ from the incoming frequency by an amount approximately equal to the balance frequency of the detector 22. The control current itself is proportional to the frequency error of the outgoing signal measured at known points in the modulation cycle and averaged over a period of at least several cycles of the modulating signal, both by the low pass filter 25 and the inertia of motor 26.

Figure 3:
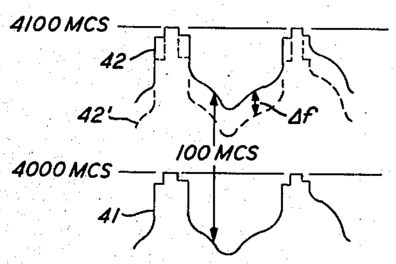
Fig. 3 shows wave forms illustrative of the circuit of Fig. 2.
Figure 3:
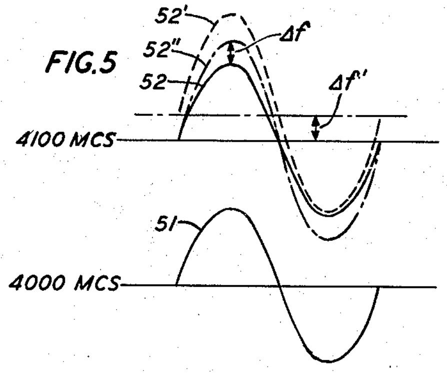
Figure 3:
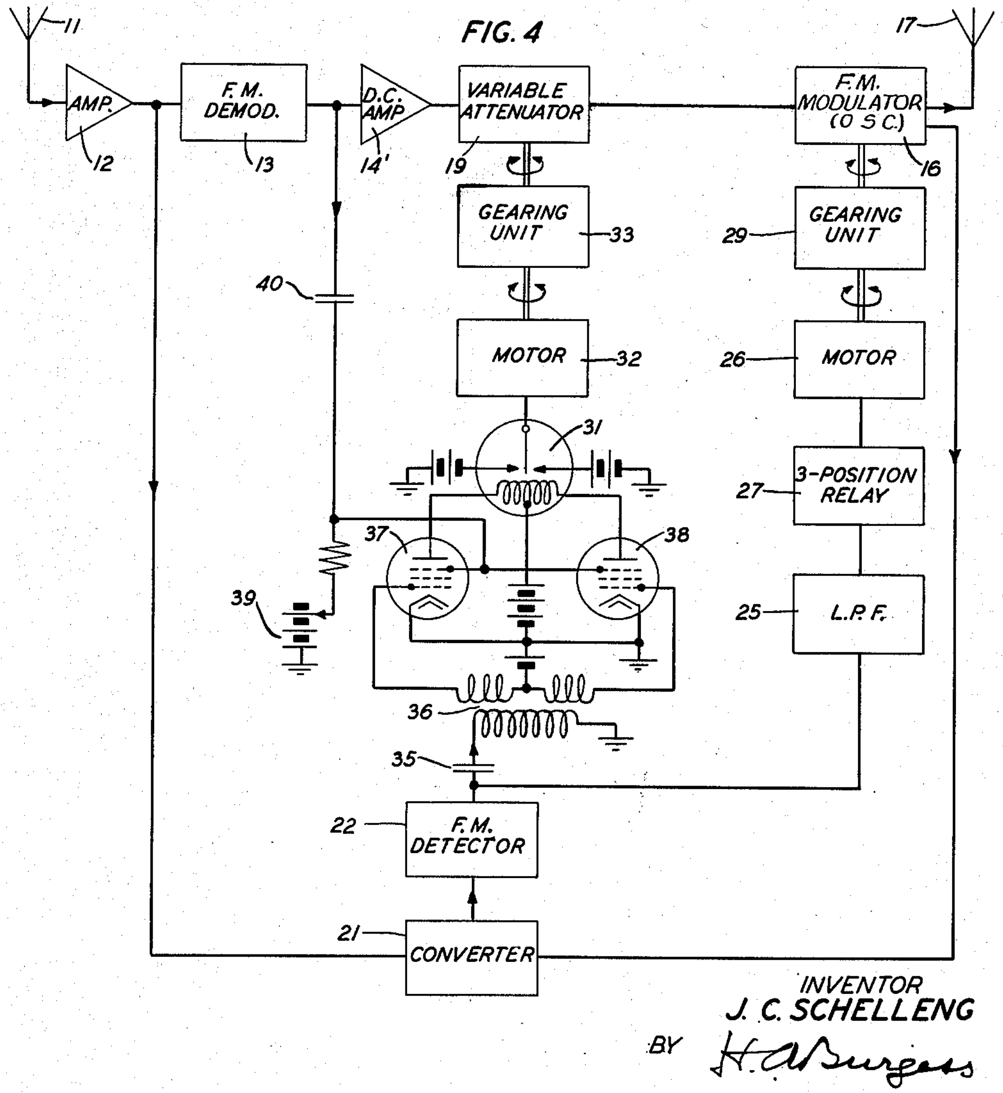

The second control current controls the outgoing frequency swing. If the gain of the amplifier 14 is properly set, and the frequency during pulse peaks is maintained as just described, the frequency of the outgoing wave will at all times be correct between pulses as well as during them, and the output of detector 22 will be zero. This is represented in part by Fig. 3 where an incoming wave 41 with pulse peaks at 4,000 megacycles is relayed as wave 42 of the same frequency swing as wave 41 but with a frequency shift or bias of 100 megacycles so that the frequency during the synchronizing pulses is 4100 megacycles.

If the gain of the signal frequency stage should become too high, the outgoing wave would appear as wave 42 which has an instantaneous frequency error between pulse peaks of $\Delta f$. Detector 22 will therefore have a finite output between pulse peaks even though it is zero during pulses. The direct-current content of the output is obtained by the low-pass filter 30. The output of filter 30 controls a three-position relay 31 similar to relay 27, and will cause the motor 31 to rotate when it exceeds a threshold value and causes the armature of relay 31 to make one of its contacts. The armature of motor 32 is coupled by a gearing unit 33 to a controlling element in attenuator 19 such as a variable potentiometer 34. The elements 30—34 are properly coupled so that an increase in the frequency swing will cause motor 32 to rotate in such a manner as to increase the attenuation, or rather, decrease the gain, of the modulating signal, and vice versa. When the gain has been sufficiently decreased so that wave form 42′ merges into wave 42, the output from detector 22 will be zero and relay 31 will release to disconnect motor 32 from its energy source. The frequency swing is therefore controlled by a current which is proportional to the outgoing frequency error averaged similarly to the first control current, by the filter 30 and the inertia of motor 32.

It will be apparent to one skilled in the art that the arrangement shown in Fig. 2 is a double feedback arrangement and that care must be taken to avoid hunting. This can be accomplished by avoiding too rapid correction by the motors 26 and 32, for example, by adjusting the units 29 and 33. Also, one of the motors could be made slow-acting relative to the other.

Although the circuit of Fig. 2 is adapted for relaying television signals, the invention is not restricted to special wave form. For example, referring now to Fig. 5, an incoming sinusoidal wave 51 which has a mean frequency of 4000 megacycles, and which may have variable direct-current components, is to be relayed as wave form 52 which is identical with wave 51 except for the 100-megacycle increase in frequency. Due to variations in the repeater, however, the remodulated signal may appear as wave 52′ which has a positive error $\Delta f'$ in the mean frequency as well as a further positive error $\Delta f$ in the frequency swing.

Referring now to Fig. 4, the receiving, demodulating, amplifying and remodulating stages are generally the same as described in connection with Fig. 1. However, since the type of signal now being considered does not usually admit of the same form of direct-current restoration as that of Fig. 3, amplifier 14′ is assumed to be direct-current coupled and a direct-current reinserter has been omitted.

The oscillator 16 frequency-control circuit comprising the low pass filter 25, relay 27, motor 26, and gearing unit 29, is the same as in Fig. 2 with the exception that the gate 23 of Fig. 2 has been omitted. By the omission of the gate, the oscillator 16 frequency-control circuit will respond to the frequency error of the outgoing signal averaged over a period determined by the low-pass filter 25 and the inertia of motor 26, rather than being weighted in favor of errors during a synchronizing signal. This control circuit will therefore reduce the average outgoing frequency error $\Delta f'$ toward zero so that the outgoing wave will have an average frequency which differs from the incoming average frequency by an amount equal to the balance frequency detector 22. And, if the gain of amplifier 14 is properly set, the outgoing wave will appear as wave form 52.

The gain of amplifier 14 may vary, however, and even though the average outgoing frequency is correct, the frequency swing may, for example, be too great by an instantaneous value of $\Delta f$ so that the outgoing wave appears as wave 52″. This error will be evidenced by a finite and proportional output from detector 22 which passes through condenser 35 to the primary of transformer 36. The secondary of transformer 36 is balanced as shown and applies a voltage to the control grids of space discharge devices 37 and 38 rendering them alternately positive and negative in a push-pull manner. There is impressed on the suppressor grids of the tubes both a negative bias from an adjustable direct source 39 and signal voltage from the output of demodulator 13 from which the direct current components have been removed by the blocking condenser 40. The source 39 is adjusted so that the suppressor grids will be driven positive only during the positive signal peaks and curent will then flow in one of the tubes 37 or 38 depending on which one, at the time of these peaks, has a positive control grid, thus giving especial weight to those errors-signals from detector 22 which occur during the positive peaks of the signal applied to tubes 36 and 37. The three-position relay 31, motor 32, and gearing unit 33 act to adjust the variable attenuator 19 as previously described so that the error frequency $\Delta f$ will be reduced to substantially zero.

It will be noted that in each of the embodiments described, the signal is relayed and located in its assigned frequency band with the same frequency swing as that of the received signal without disturbing any direct-current content the signal may have. Although the invention has been described in connection with specific illustrations, numerous other embodiments will readily occur to one skilled in the art without departing from the spirit and scope of the invention.

What is claimed is:

1. In a repeater for relaying frequency-modulated signals: a main signal path including means for receiving said signals, means for recovering the modulating signals from said received signals, an amplifier for the recovered signals, a frequency modulator including a high frequency oscillator for remodulating the recovered amplified signals, and means for transmitting the remodulated signals; and an auxiliary control circuit which comprises means for comparing the frequency of the received waves with the frequency of the remodulated waves, means for deriving from said comparison a first control current substantially proportional to the average frequency difference of said compared waves and a second control current substantially proportional to the frequency difference of the compared waves measured at predetermined times in the modulation cycle, means for applying one of said control currents to said amplifier to control the gain thereof, and means for applying the other of said control currents to said oscillator to control the frequency thereof.

2. In a repeater for relaying frequency-modulated signal waves wherein the original signal is recovered at the repeater, means to receive said waves, means to recover the original signal from said waves, means for controlling the amplitude of said recovered signal, a frequency modulator comprising an oscillator having frequency determining means, means to apply said recovered signal to said modulator, means to beat the output of said modulator with said received waves, a first means connected to said beating means for deriving a first current proportional to the average frequency difference between the received and the remodulated waves, a second means connected to said beating means for deriving a second current proportional to the average frequency difference between the said received and remodulated waves at predetermined times in the modulation cycle, means to apply one of said currents to said amplitude controlling means to control the same, and means to apply the other of said currents to said frequency determining means to control the frequency of said oscillator.

3. In a frequency modulation system, means for receiving and retransmitting frequency-modulated signal waves, a first circuit connected between said receiving and retransmitting means including demodulation means for deriving from said waves the modulating signal, means to remodulate the said modulating signal on a new carrier comprising an oscillator having frequency determining means and means connected between said demodulation means and said remodulation means to control the amplitude of said modulating signal, a second circuit connected between said receiving means and the output of said remodulation means and including comparison means for deriving a wave of the difference frequency between the received waves and the remodulated waves, a first mans connected to the output of said comparison means for averaging the output thereof, a second means connected to the output of said comparison means for deriving the output therefrom only during predetermined times in the modulation cycle, means connecting one of said first and second means to said amplitude control means, and means connecting the other of said first and second means to said frequency determining means.

4. A system for relaying frequency-modulated radio signals having a variable direct-current component, said system having a main transmission path including means to receive said signals, means to demodulate said signals, a frequency modulator comprising a high frequency oscillator to remodulate the recovered signals, an amplifier connected between said demodulator and said modulator, gain control means for said amplifier, and frequency control means for said oscillator, and an auxiliary control circuit including a converter having inputs and an output, means to impress the received signals and the remodulated signals on said inputs, a detector connected to said output, a first means connected to said detector to derive a first current therefrom at predetermined times in the modulation cycle, a second means connected to said detector to derive a second current therefrom, means to apply one of said currents to said frequency control means to control the same and means to apply the other of said currents to said gain control means to control the same.

5. A system for relaying frequency-modulated signals having a variable direct-current component which comprises input means to receive said signals, means connected to said receiving means for recovering the modulating signal from the received signals, a variable gain amplifier connected to said last-named means, a frequency modulator comprising a variable frequency oscillator, means for applying the amplified modulating signals to the input of said modulator, output means connected to the output of said modulator, and an auxiliary control circuit comprising a frequency converter connected between said input means and the output of said modulator for obtaining a wave of the difference frequency between the received signals and the output of said modulator, detector means connected to said converter, frequency control means for said oscillator connected to said detector, gating means responsive to predetermined recurrent portions of the modulation cycle of said modulating signals connected between said frequency control means and said detector, and gain control means connected between said detector and said variable gain amplifier.

6. A system for relaying signal waves having a variable direct-current component wherein the intelligence signals are frequency modulated on a high frequency carrier wave, said system comprising means for receiving said frequency-modulated waves, means for recovering said signals from the received waves, an amplifier, gain control means connected to said amplifier, means to impress the recovered signals on said amplifier, a frequency modulator comprising a high frequency oscillator having frequency control means, means to impress the amplified recovered signals on said modulator, output means connected to the output of said modulator, comparison means connected between said receiving means and said output means for deriving a voltage which varies in accordance with the difference in frequency of said received waves and the output of said modulator, means for completing a first circuit between said comparison means and said gain control means at predetermined times in the modulation cycle, and a second circuit connecting the output of said comparison means to said frequency control means.

7. The combination in a repeater for relaying frequency-modulated signals of comparison means to compare the frequency of the relayed signals with the frequency of the received signals, a first means to derive from said comparison indications of the mean frequency error of the relayed signals as compared to the received signals, a second means to derive from said comparison indications of the mean frequency error of the relayed signals as compared to the received signals and weighted in favor of the errors occurring in one sense of frequency swing, means in said repeater for controlling the frequency swing of the relayed signals in accordance with one of said indications, and means in said repeater to control the mean frequency of the relayed signals in accordance with the other of said indications.

8. A repeater for frequency modulated signal waves having a main transmission path including means for receiving said signal waves, means for recovering the modulating signals from said signal waves, a frequency modulator, means for applying said recovered modulating signals to said frequency modulator, means for retransmitting the output of said frequency modulator, and means connected between said recovering means and said frequency modulator for controlling the amplitude of said recovered modulating signals, and an auxiliary control circuit comprising comparison means for comparing the received signal waves with the output of said frequency modulator, means connected to the output of said comparison means for deriving a first control current proportional to the average difference in frequency of the said received waves and the said retransmitted waves, means for applying said first control current to said frequency modulator to control the mean frequency thereof, means connected to the output of said comparison means for deriving a second control current which varies in accordance with the difference in frequency between said received waves and the output of said frequency modulator at the peaks of the frequency swing in one sense of deviation only, and means for applying said second control current to the said amplitude control means for controlling the amplitude of said recovered modulating signals.

JOHN C. SCHELLENG.

References Cited in the file of this patent

UNITED STATES PATENTS

| Number | Name | Date |
|---|---|---|
| 2,250,104 | Morrison | July 22, 1941 |
| 2,296,919 | Goldstine | Sept. 29, 1942 |

| Number | Name | Date |
|---|---|---|
| 2,296,962 | Tunick | Sept. 29, 1942 |
| 2,347,459 | Goetter | Apr. 25, 1944 |
| 2,407,212 | Tunick | Sept. 3, 1946 |
| 2,424,830 | Kenefake | July 29, 1947 |
| 2,477,428 | Sprague et al. | July 26, 1949 |
| 2,481,902 | Bradley | Sept. 13, 1949 |
| 2,501,368 | White | Mar. 21, 1950 |
| 2,550,519 | Bataille | Apr. 24, 1951 |